(12) United States Patent
Suzuki

(10) Patent No.: US 6,339,441 B2
(45) Date of Patent: *Jan. 15, 2002

(54) ELECTROPHOTOGRAPHIC APPARATUS WITH PLURAL BEAM EXPOSURE CONTROLLED ACCORDING TO DETECTED POTENTIAL

(75) Inventor: Kazuo Suzuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,312

(22) Filed: Dec. 9, 1999

(30) Foreign Application Priority Data

Dec. 15, 1998 (JP) .............................. 10-375289

(51) Int. Cl.[7] ................................ G03G 15/04
(52) U.S. Cl. ...................................... 347/133; 347/236
(58) Field of Search ................................ 347/129, 131, 347/132, 133, 236, 246, 237; 399/51

(56) References Cited

U.S. PATENT DOCUMENTS

| 4,676,623 A | 6/1987 | Akashi et al. ............. 354/408 |
|---|---|---|
| 4,805,973 A * | 2/1989 | Watanabe ............... 347/237 X |
| 4,855,766 A * | 8/1989 | Suzuki ........................ 347/246 |
| 5,182,658 A | 1/1993 | Ishizaki et al. ............. 358/483 |
| 5,750,985 A | 5/1998 | Suzuki ........................ 250/234 |
| 5,936,223 A | 8/1999 | Suzuki et al. .............. 235/462 |
| 6,024,870 A1 * | 3/2001 | Nakagawa et al. ......... 347/133 |

FOREIGN PATENT DOCUMENTS

| JP | 63-146062 | * | 6/1988 |
|---|---|---|---|
| JP | 63-151973 | * | 6/1988 |
| JP | 10-48922 | * | 2/1998 |
| JP | 11-157126 | * | 6/1999 |

* cited by examiner

Primary Examiner—Joan Pendegrass
(74) Attorney, Agent, or Firm—Fitzpatrick, Cella, Harper & Scinto

(57) ABSTRACT

The present invention relates to an electrophotographic apparatus which has a photosensitive member, first light emitting means and second light emitting means, detecting means, and control means and the control means variably adjusting the light emitting amount of the first light emitting means and the light emitting amount of the second light emitting means so that a ratio between the light emitting amount of the first light emitting means and the light emitting amount of the second light emitting means becomes a predetermined value.

16 Claims, 4 Drawing Sheets

ELECTROPHOTOGRAPHIC APPARATUS WITH PLURAL BEAM EXPOSURE CONTROLLED ACCORDING TO DETECTED POTENTIAL

BACKGROUND OF THE INVENTION

1. Field of the Invention

The present invention relates to an electrophotographic apparatus such as a laser beam printer and the like.

2. Related Background Art

FIG. 4 is a schematic constructional view showing a conventional image forming apparatus.

In such an image forming apparatus, as shown in FIG. 4, a photosensitive drum (latent image bearing member) 101 constituted by coating a photo-conductive layer on a cylindrical conductive substrate is supported for rotation in a direction shown by the arrow R1. Around the photosensitive drum 101, there are disposed, in order along a rotational direction thereof, a scorotron charger 102 for uniformly charging a surface of the photosensitive drum 101, an exposure device 140 for reading an original and for forming an electrostatic latent image by exposing the photosensitive drum 101 in accordance with an image signal, a developing device 104 for forming a toner image by adhering toner to the electrostatic latent image, a surface potential sensor (potential detecting means) 141 for detecting surface potential of the photosensitive drum 101, a corona transfer charger (transfer charger) 108 for transferring the toner image formed on the photosensitive drum 101 onto a transfer sheet (recording material) P, an electrostatic separating charger 109 for separating the transfer sheet P to which the toner image was transferred from the photosensitive drum 101, a cleaning device 113 for removing residual toner from the photosensitive drum 101 after the toner image transferring, and pre-exposure means 130 for eliminating residual charge on the photosensitive drum 101.

After separated from the photosensitive drum 101, the transfer sheet P to which the toner image was transferred by the transfer charger 108 is conveyed to a fixing device 112, where the toner image is fixed to the transfer sheet to obtain a desired print image, and the transfer sheet P to which the toner image was fixed is discharged out of a main body of the image forming apparatus.

In an image scanner portion 118, an original 115 rested on an original glass stand 114 is scanned and read by an illumination lamp 116, and light reflected from the original scanned by the illumination lamp 116 is focused on a photo-electric converting element 119 is through mirrors 117a, 117b, 117c and a lens 117d. The electrical signal outputted from the photo-electric converting element 119 is A/D-converted by an A/D-converter 121 into a digital signal which is in turn converted by control means 122 into an image signal proportional to image density. The image signal is sent to a laser driver 124 for generating a signal for driving a laser 120, thereby modulating light emission of the laser (light emitting means) 120 in accordance with the image signal. A laser beam 103 modulated in accordance with the image signal is sent to the photosensitive drum 101 as image information through a polygon mirror 128 and a mirror 117e, thereby forming the electrostatic latent image.

Due to dispersion in manufacturing accuracy, there are photosensitive drums having good sensitivity and photosensitive drums having bad sensitivity. Further, the sensitivity of the photosensitive drum is changed by change in a sensitive property of the photosensitive drum influenced by endurance and/or a surrounding environmental condition.

In order to absorb or eliminate such dispersion, there has been a technique in which the surface potential sensor 141 contacted with the surface of the photosensitive drum is provided within the image forming apparatus, so that a light emitting amount of the laser 120 is adjusted by the control means 122 to keep the surface potential of the photosensitive drum to desired potential, on the basis of the fact that, as shown in FIG. 5, the surface potential of the photosensitive drum depends upon the light emitting amount of the laser.

Among methods for controlling the surface potential of the photosensitive drum, there is a method in which, for example, exposure control coefficient β associated with a relationship between the light emitting amount of the laser and the surface potential Vd of the photosensitive drum, as shown by the following equation is repeatedly used:

$$LP(i)=LP(i-1)+\beta(Vdt-Vd(i-1))$$

i=1, 2, 3, . . .

Where, Vdt is a target value of potential of dark portion, LP(i) is light emitting amount of laser after i-th correction, Vd(i) is potential of dark portion after i-th correction, β is exposure control coefficient, and LP(0) is initial value of light emitting amount of laser.

On the other hand, in order to improve an image forming speed and a resolving power, there was a technique in which a plurality of lasers are used for image formation. In such a case, the above-mentioned potential control was repeatedly effected for each laser.

However, in such a conventional image forming apparatus, it took a long time to obtain the desired surface potential of the photosensitive drum or the desired surface potential of the photosensitive drum could not be obtained, or there might occur poor image formation due to slight difference in light amounts of lasers.

SUMMARY OF THE INVENTION

One embodiment of the present invention is directed to an electrophotographic apparatus. The apparatus includes a photosensitive member, a first light emitting unit and second light emitting unit. The first and second light emitting units expose the photosensitive member charged, in accordance with image information. The second light emitting unit exposes a second portion of the photosensitive member that is different from a first portion of the photosensitive member, which is exposed by the first light emitting unit. A detecting unit is adapted to detect a potential of an area on the photosensitive member and detects a potential of the first portion of the photosensitive member and a potential of the second portion of the photosensitive member simultaneously. A control unit is adapted to control amounts of light emitted from the first and second light emitting units in accordance with a detection result of the detecting unit.

An object of the present invention is to provide an electrophotographic apparatus in which light emitting amounts of a plurality of light emitting means can be adjusted for a short time.

Another object of the present invention is to provide an electrophotographic apparatus in which, even when a plurality of light emitting means are used, potential control of a surface of a photosensitive member can be effected for a short time, regardless of dispersion in sensitivity (with respect to illumination light) of the photosensitive drum due to change in endurance and/or change in a surrounding environmental condition.

The other objects and features of the present invention will be apparent from the following detailed explanation referring to the accompanying drawings.

DETAILED DESCRIPTION OF THE PREFERRED EMBODIMENTS

The present invention will now be explained in connection with an embodiment thereof with reference to the accompanying drawings.

Figure 1:
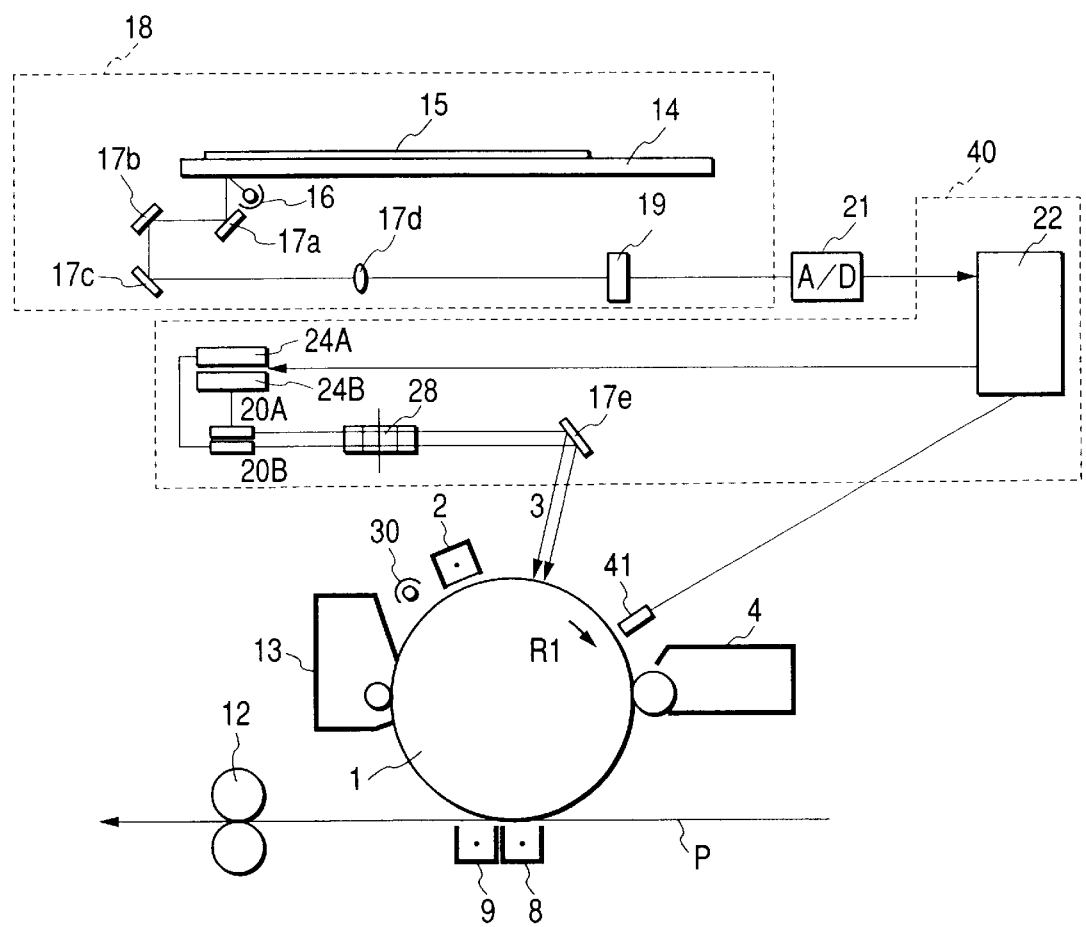
FIG. 1 is a schematic constructional view showing an image forming apparatus according to an embodiment of the present invention.

FIG. 1 is a schematic constructional view showing an image forming apparatus according to an embodiment of the present invention.

In an image forming apparatus according to the embodiment of the present invention, as shown in FIG. 1, a photosensitive drum (latent image bearing member) 1 constituted by coating a photo-conductive layer on a cylindrical conductive substrate is supported for rotation in a direction shown by the arrow R1.

Around the photosensitive drum 1, there are disposed, in order along a rotational direction thereof, a scorotron charger 2 for uniformly charging a surface of the photosensitive drum 1, an exposure device 22 for reading an original and for forming an electrostatic latent image by exposing the photosensitive drum 1 in accordance with an image signal, a developing device 4 for forming a toner image with reversal developing by adhering toner to the electrostatic latent image, a surface potential sensor 41 for detecting surface potential of the photosensitive drum 1 in the vicinity of a developing position, a corona transfer charger (transfer charger) 8 for transferring the toner image formed on the photosensitive drum 1 onto a transfer sheet (recording material) P, an electrostatic separating charger 9 for separating the transfer sheet P to which the toner image was transferred from the photosensitive drum 1, a cleaning device 13 for removing residual toner from the photosensitive drum 1 after the toner image transferring, and pre-exposure means 30 for eliminating residual charge on the photosensitive drum 1.

After separated from the photosensitive drum 1, the transfer sheet P to which the toner image was transferred is conveyed to a fixing device 12, where the toner image is fixed to the transfer sheet to obtain a desired print image, and the transfer sheet P to which the toner image was fixed is discharged out of a main body of the image forming apparatus.

In the exposure device 40 incorporated into the image forming apparatus according to the embodiment of the present invention, there are-provided the surface potential sensor 41 for detecting potential of an exposure area on the surface of the photosensitive drum 1, and control means 22 for adjusting light emitting amounts of lasers 20A, 20B to keep the detected potential of the exposure area on the surface of the photosensitive drum 1 to predetermined potential, and the control means 22 serves to adjust the lasers simultaneously so that a ratio between the light emitting amount of the laser 20A and the light emitting amount of the laser 20B becomes a predetermined value.

In an image scanner portion 18, an original 15 rested on an original glass stand 14 is scanned and read by an illumination lamp 16, and light reflected from the original 15 scanned by the illumination lamp 16 is focused on a photo-electric converting element 19 is through mirrors 17a, 17b, 17c and a lens 17d. The electrical signal outputted from the photo-electric converting element 19 is A/D-converted by an A/D-converter 21 into a digital signal which is in turn converted by the control means 22 into an image signal proportional to image density. The image signal is sent to laser drivers 24A, 24B for generating signals for driving the lasers 20A, 20B, thereby modulating light emission of the lasers 20A, 20B in accordance with the image signal. Laser beams modulated in accordance with the image signal are sent to the photosensitive drum 1 as image information through a polygon mirror 28 and a mirror 17e, thereby forming the electrostatic latent image.

The lasers 20A, 20B alternately effect light illumination for one pixel (one line) repeatedly in a sub-scanning direction of the photosensitive drum 1, always during the image exposure and during the adjustment of the light emitting amounts. During the adjustment of the light emitting amounts, both the lasers 20A, 20B are in an ON condition, and potential of an area exposed by the combination of the lasers 20A, 20B is measured by the potential sensor 41. In the sub-scanning direction of the photosensitive drum 1, a potential detecting width of the potential sensor 41 is equal to or greater than a width corresponding to two pixels. Accordingly, the potential sensor 41 detects the potential of the area where both a line illuminated by the laser 20A and a line illuminated by the laser 20 are included.

In the illustrated embodiment, the potential control of the surface of the photosensitive drum is performed on alternate hours. The reason is that change in the image due to change in the sensitive property of the photosensitive drum caused by change in the environmental condition and time-lapse must be suppressed. In this case, in a condition that both the lasers 20A and 20B are turned ON, the potential control of the surface of the photosensitive drum is effected so that the light amounts of the lasers 20A and 20B are controlled as shown by the following equation:

$$ALP(i)+BLP(i)=ALP(i-1)+BLP(i-1)+\beta(Vlt-Vl(i-1))$$

$$ALP(i)/BLP(i)=ALP(i-1)/BLP(i-1) \qquad (1)$$

i=1, 2, 3, ...

Where, Vlt is target value of potential of bright portion, ALP(i) is light emitting amount of laser 20A after i-th correction, Vl(i) is potential of light portion after i-th correction, β is exposure control coefficient, ALP(0) is initial value of light emitting amount of laser 20A, and BLP(0) is initial value of light emitting amount of laser 20B.

As mentioned above, for the potential control which is effected one time per an hour, the light emitting amounts of the lasers 20A, 20B are corrected by i times so that the potential of the area exposed by the lasers 20A, 20B approaches the target value. Whenever the light emitting amounts of the lasers 20A, 20B are corrected, the above equation (1) is maintained. That is to say, whenever the light emitting amounts are corrected, the ratio between the light emitting amount of the laser 20A and the light emitting amount of the laser 20B becomes constant.

In other words, when the adjustment is effected while changing the light emitting amounts of the lasers 20A, 20B, the change rate of the light emitting amount of the laser 20A becomes equal to the change rate of the light emitting amount of the laser 20B.

The reason why the lasers 20A, 20B are controlled simultaneously is to avoid any problems caused when the lasers 20A, 20B are controlled independently (i.e., when the area exposed by the laser 20A and the area exposed by the laser 20B are detected independently by the sensor 41).

For example, a case where, regarding the electrostatic latent image, the control is effected so that a target value of potential of the dark portion is 500 V and a target value of potential of the light portion is 100 V will be explained.

When the potential control of the surface of the photosensitive drum is effected by the lasers 20A, 20B, it is assumed that, by effecting the control, for example, with the target value (of each laser) of 300 V between 500 V of potential of the dark portion and 100 V of potential of the light portion, the light amounts of the lasers 20A, 20B are derived.

Figure 2:
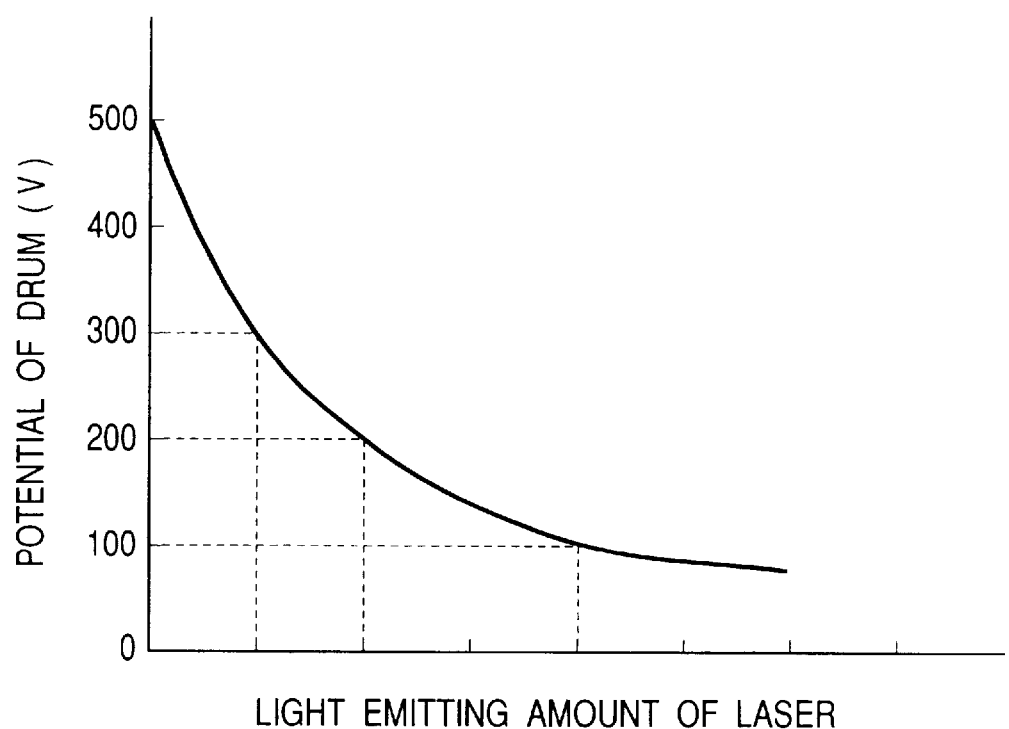
FIG. 2 is a graph showing a relationship between a laser light emitting amount and potential of a photosensitive drum in the embodiment of the present invention.

However, as a result that both the lasers 20A and 20B were actually energized simultaneously and the surface potentials of the areas (on the photosensitive drum) exposed by the lasers 20A, 20B were measured, it was found that the potential of the light portion of the latent image does not become the target value of 100 V but becomes 200 V, and, accordingly, desired contrast potential cannot be obtained between developing bias and the potential of the light portion. The reason is that, as shown in FIG. 2, the sensitive property of the photosensitive drum is not linear, but, potential drop is become dull as the light amount is increased.

Accordingly, as mentioned above, even when the exposure amounts in which the surface potential of the photosensitive drum is charged from 500 V to 300 V by the lasers 20A, 20B are determined independently and the lasers 20A, 20B are simultaneously energized with such exposure amounts, the potential is not decreased up to 100 V.

Figure 3:
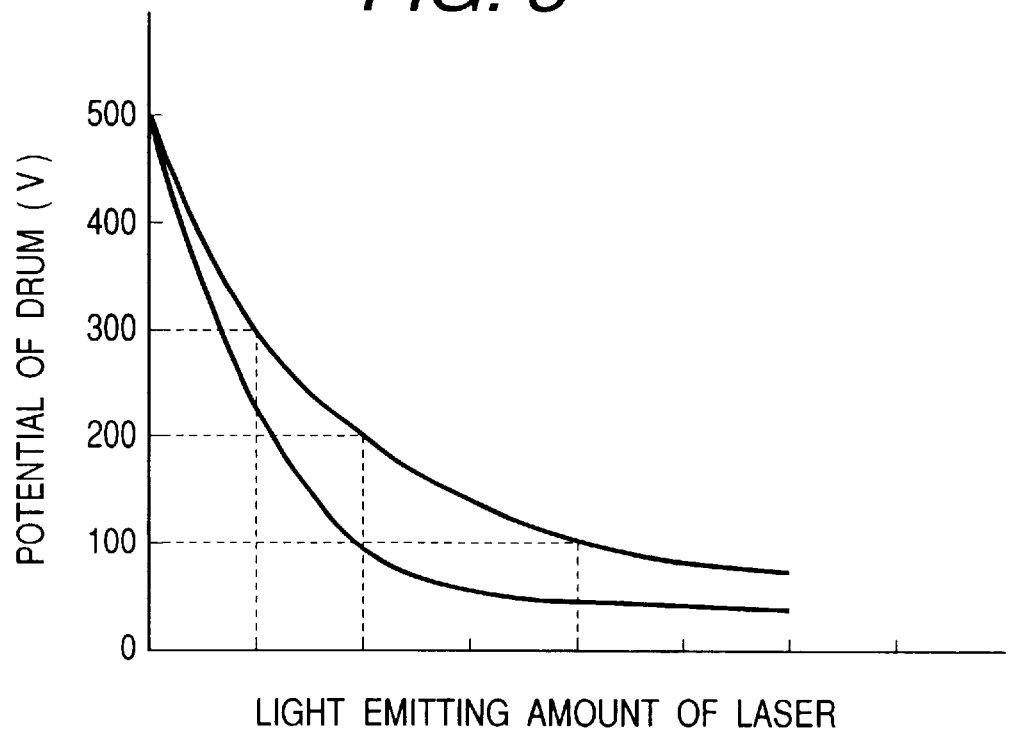
FIG. 3 is a graph showing a relationship between laser light emitting amounts and potential of a photosensitive drum in an embodiment of the present invention, for explaining a problem caused when potentials of two lasers are controlled.
Figure 4:
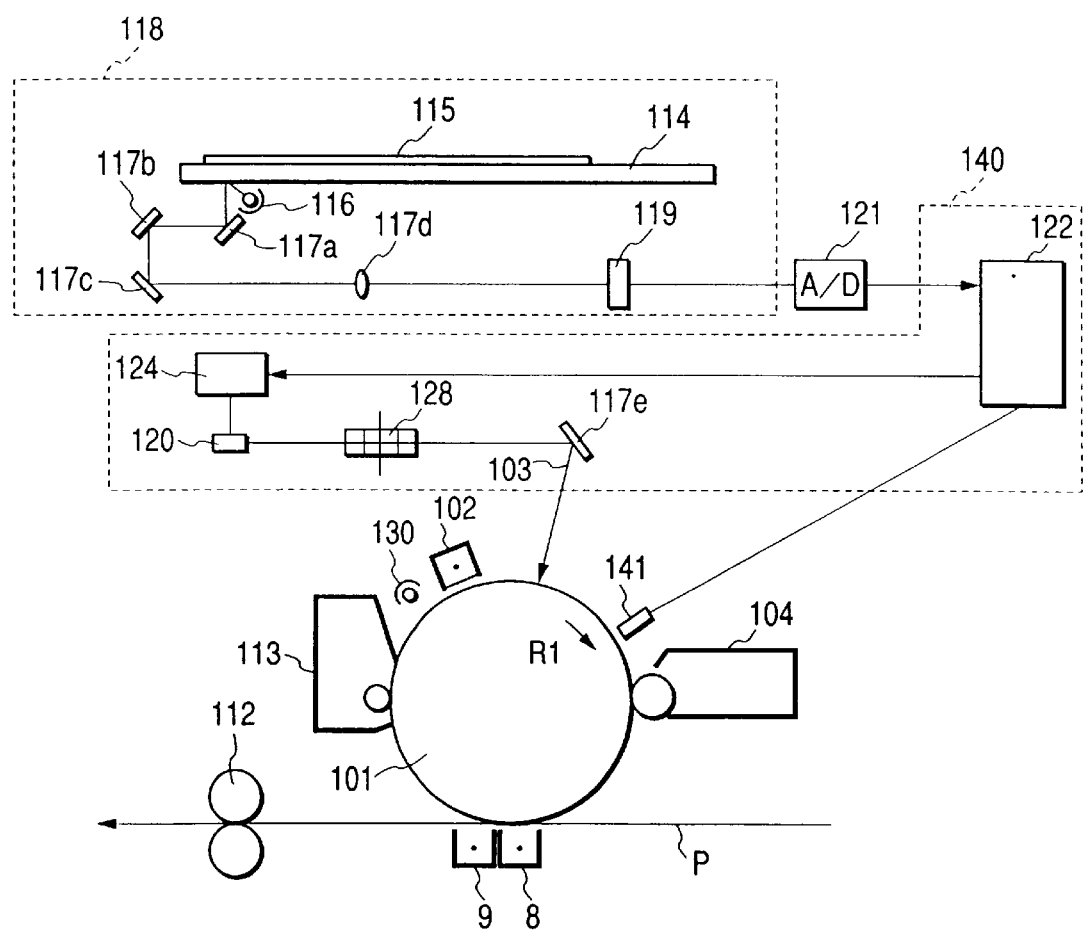
FIG. 4 is a schematic constructional view showing a conventional image forming apparatus.
Figure 5:
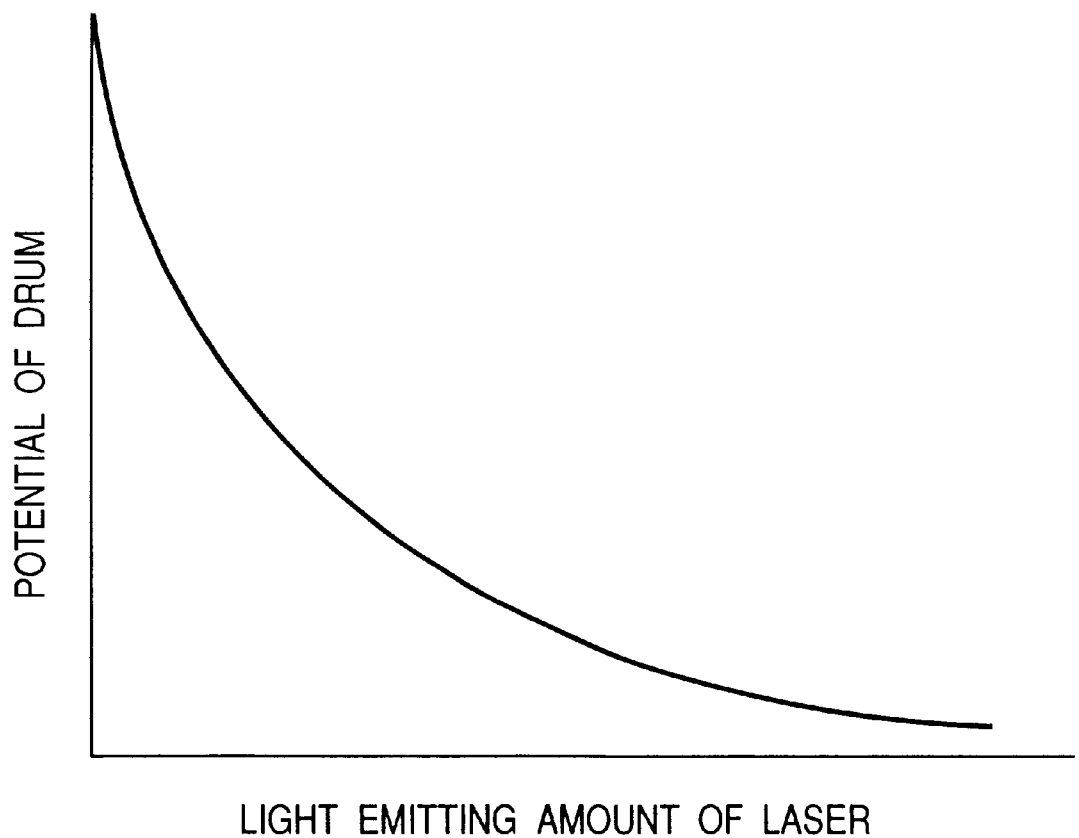
FIG. 5 is a graph showing a relationship between a laser light emitting amount and potential of a photosensitive drum in the image forming apparatus of FIG. 4.

In consideration of this, for example, although it is considered that the lasers are controlled independently so that the surface potential of the photosensitive drum is changed from 500 V to 200 V and the potential of the light portion of the latent image can be achieved to the desired value of 100 V by effecting exposure using both the lasers, in effect, as shown in FIG. 3, since the sensitive property of the photosensitive drum has dispersion due to configuration of the surface of the photosensitive drum, change in the surrounding environmental condition and/or change in endurance, the correct control cannot be realized by such control.

Further, if the light portion of the latent image can be controlled to the target potential of 100 V, the following problem may arise. Normally, regarding the potential control, the target potential a certain allowable range. For example, control is finished when the potential reaches within a range of 200 V (target potential)±10 V. This is the counter measure for preventing the control time from become lengthened. When this control is effected by using the lasers 20A, 20B independently, for the target values of 200 V of the lasers 20A, 20B, for example, the laser 20A may be controlled with 210 V and the laser 20B may be controlled with 190 V. Thus, even when the potential of the light portion of the latent image can be achieved to the desired value of 100 V by effecting exposure using both the lasers, since densities and dot diameters of the lasers 20A, 20B are differentiated, image unevenness may occur.

To the contrary, according to the illustrated embodiment of the present invention, since the control means 22 adjusts and changes the light emitting amounts of the lasers 20A, 20B to bring the ratio between the light emitting amount of the laser 20A and the light emitting amount of the laser 20B to the predetermined value as indicated by the above equation (1) so that the detected potential of the exposure area on the surface of the photosensitive drum becomes the predetermined potential, the potential control of the photosensitive drum 1 can be effected for a short time without generating unevenness due to differentiation of the lasers 20A, 20B, regardless of dispersion of the sensitive property of the surface of the photosensitive drum 1 due to change in environment and change in endurance.

Incidentally, in the illustrated embodiment, while an example that two lasers are used was explained, of course three or more lasers may be used.

What is claimed is:

1. An electrophotographic apparatus comprising:

a photosensitive member;

first light emitting means and second light emitting means for exposing said photosensitive member charged, in accordance with image information, wherein said second light emitting means is capable of exposing a second portion of said photosensitive member that is different from a first portion of said photosensitive member exposed by said first light emitting means;

detecting means for detecting potential of an area on said photosensitive member; and control means for controlling light emitting amounts of said first and second light emitting means in accordance with a detection result of said detecting means, wherein said detecting means detects a potential of said first portion of said photosensitive member and a potential of said second portion of said photosensitive member simultaneously.

2. An electrophotographic apparatus according to claim 1, wherein said control means adjust the light emitting amounts of said first and second light emitting means so that the potential of the area on said photosensitive member is brought within a predetermined range.

3. An electrophotographic apparatus according to claim 1, wherein said first and second light emitting means emit laser beams, respectively.

4. An electrophotographic apparatus according to claim 1, wherein said first portion and said second portion are formed alternatively for one line in a sub-scanning direction of said photosensitive member.

5. An electrophotographic apparatus according to claim 4, wherein a detecting width of said detecting means is equal to or greater than a width corresponding to two pixels in the sub-scanning direction of said photosensitive member.

6. An electrophotographic apparatus according to claim 1, wherein said control means variably adjusts the light emitting amount of said first light emitting means and the light emitting amount of said second light emitting means so that a ratio between the light emitting amount of said first light emitting means and the light emitting amount of said second light emitting means becomes a predetermined value.

7. An electrophotographic apparatus comprising:

a photosensitive member;

first light emitting means and second light emitting means for exposing said photosensitive member charged, in accordance with image information, wherein said first and second light emitting means can alternately illuminate said photosensitive member for one line in a sub-scanning direction of said photosensitive member;

detecting means for detecting potential of an area on said photosensitive member exposed by said first and second light emitting means; and control means for controlling light emitting amounts of said first and second light emitting means simultaneously in accordance with a detection result of said detecting means, said control means variably adjusting the light emitting amount of said first light emitting means and the light emitting amount of said second light emitting means so that a ratio between the light emitting amount of said first light emitting means and the light emitting amount of said second light emitting means becomes a predetermined value.

8. An electrophotographic apparatus according to claim 7, wherein said control means adjust the light emitting amounts of said first and second light emitting means so that the potential of the area on said photosensitive member is brought within a predetermined range.

9. An electrophotographic apparatus according to claim 7, wherein said first and second light emitting means emit laser beams, respectively.

10. An electrophotographic apparatus according to claim 7, wherein a detecting width of said detecting means is equal to or greater than a width corresponding to two pixels in the sub-scanning direction of said photosensitive member.

11. An electrophotographic apparatus, comprising:

a photosensitive member;

first light emitting means and second light emitting means for exposing a charged surface of said photosensitive member, in accordance with image information, wherein said second light emitting means is capable of exposing a second portion of said photosensitive member that is different from a first portion of said photosensitive member exposed by said first light emitting means;

detecting means for detecting potential of the surface of said photosensitive member, wherein said detecting means outputs single detection result when detecting both potentials of said first portion and said second portion; and control means for controlling light emitting amounts of said first and second light emitting means in accordance with the detection result of said detecting means.

12. An electrophotographic apparatus according to claim 11, wherein said control means adjust the light emitting amounts of said first and second light emitting means so that the potential of the area on said photosensitive member is brought within a predetermined range.

13. An electrophotographic apparatus according to claim 11, wherein said first and second light emitting means emit laser beams, respectively.

14. An electrophotographic apparatus according to claim 11, wherein said first portion and said second portion are formed alternately for one line in a sub-scanning direction of said photosensitive member.

15. An electrophotographic apparatus according to claim 14, wherein a detecting width of said detecting means is equal to or greater than a width corresponding to two pixels in the sub-scanning direction of said photosensitive member.

16. An electrophotographic apparatus according to claim 11, wherein said control means variably adjust the light emitting amount of said first light emitting means and the light emitting amount of said second light emitting means so that a ration between the light emitting amount of said first light emitting means and the light emitting amount of said second light emitting means becomes a predetermined value.

* * * * *

UNITED STATES PATENT AND TRADEMARK OFFICE
CERTIFICATE OF CORRECTION

PATENT NO. : 6,339,441 B2
DATED : January 15, 2002
INVENTOR(S) : Kazuo Suzuki

It is certified that error appears in the above-identified patent and that said Letters Patent is hereby corrected as shown below:

Title page,
Item [65], Patent Publication Date:, insert item -- US2001-0033319-A1 Oct. 2001 --.

Column 1,
Line 37, "After" should read -- After being --.

Column 3,
Line 55, "After" should read -- After being --; and
Line 64, "are-provided" should read -- are provided --.

Column 5,
Line 34, "potential drop is become dull" should read -- its potential drops --; and
Line 61, "become" should read -- becoming --.

Column 8,
Line 32, "ration" should read -- ratio --.

Signed and Sealed this

Twenty-ninth Day of July, 2003

JAMES E. ROGAN
*Director of the United States Patent and Trademark Office*